United States Patent [19]

Oike

[11] Patent Number: 4,852,361
[45] Date of Patent: Aug. 1, 1989

[54] REFRIGERATOR WITH A MALFUNCTION DETECTION SYSTEM

[75] Inventor: Hiroshi Oike, Osaka, Japan

[73] Assignee: Kabushiki Kaisha Toshiba, Kawasaki, Japan

[21] Appl. No.: 164,962

[22] Filed: Mar. 7, 1988

[30] Foreign Application Priority Data

Mar. 11, 1987 [JP] Japan .................................. 62-57573

[51] Int. Cl.⁴ ........................ F25B 49/00; F25D 17/04
[52] U.S. Cl. ........................................ 62/131; 62/155; 62/187
[58] Field of Search .................. 62/131, 126, 127, 128, 62/129, 140, 150, 151, 155, 157, 158, 186, 187, 234

[56] References Cited

U.S. PATENT DOCUMENTS

| | | | |
|---|---|---|---|
| 4,392,358 | 7/1983 | Hicks | 62/128 X |
| 4,553,400 | 11/1985 | Branz | 62/127 |
| 4,665,710 | 5/1987 | Kyzer et al. | 62/155 |
| 4,688,393 | 8/1987 | Linstromberg et al. | 62/187 |
| 4,689,966 | 9/1987 | Nonaka | 62/187 |
| 4,691,195 | 9/1987 | Sigelman et al. | 62/131 X |

FOREIGN PATENT DOCUMENTS

| | | |
|---|---|---|
| 62-93676 | 6/1987 | Japan . |
| 449730 | 7/1936 | United Kingdom . |
| 1595741 | 1/1978 | United Kingdom . |
| 2183868 | 11/1986 | United Kingdom . |

Primary Examiner—Harry B. Tanner
Attorney, Agent, or Firm—Cushman, Darby & Cushman

[57] ABSTRACT

A refrigerator comprises a damper controlling inflow of cold air into a compartment thereof, a temperature sensor for detecting the temperature within the compartment, a damper drive device for driving the damper in accordance with the detected temperature in the compartment, a damper position detection device for detecting the open state and the closed state of the damper, a heater for defrosting the damper, an abnormality detection device, and a malfunction detection device. The abnormality detection device monitors the time that the damper drive device drives the damper, and when the driven time reaches a predetermined value, energizes the heater to defrost the damper. The malfunction detection device monitors the time that the heater is energized, and when the energization time of the heater reaches a predetermined value, deenergizes the heater.

14 Claims, 4 Drawing Sheets

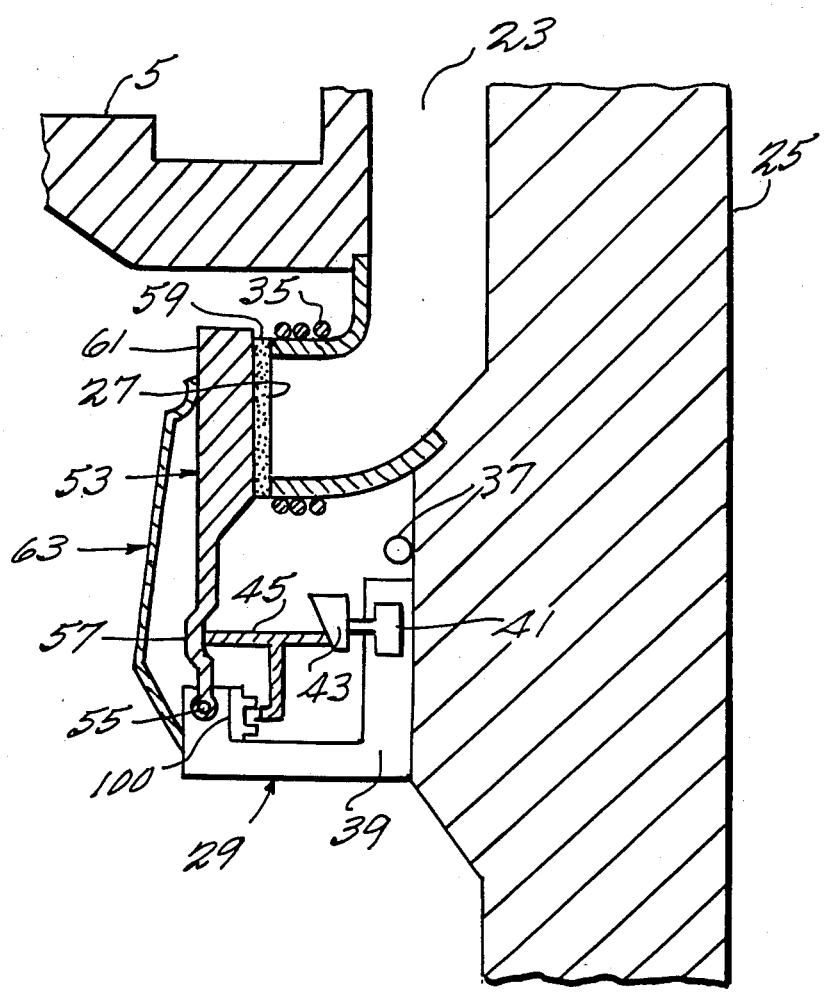
F I G. 4

REFRIGERATOR WITH A MALFUNCTION DETECTION SYSTEM

FIELD OF THE INVENTION

The present invention relates, in general, to refrigerators. More particularly, the invention relates to a fan-cooled refrigerator with a malfunction detection system.

BACKGROUND OF THE INVENTION

As is well known, fan-cooled refrigerators have a damper provided on the outlet of an air supply duct through which cold air generated by an evaporator is supplied to a compartment. The damper opens and closes the outlet in order to control the interior temperature of the compartment. This conventional damper is provided with a motor for driving a damper blade and a position detection switch whose contacts are opened and closed in accordance with the position of the damper blade. The damper is controlled to open and close the outlet in accordance with the compartment's interior temperature, which is detected by a temperature sensor provided therein, and in accordance with the detected position of the damper blade, so that the compartment's interior temperature is maintained at a set temperature.

If, however, the damper is subject to frosting, the damper will not open and close the outlet of the air supply duct even when the motor is operated, and the temperature within the compartment will vary from a set temperature. In other words, when the damper is frosted and locked in the closed position, there will be an abnormally high temperature within the compartment. When the damper is frosted and locked in the open position, there will be an abnormally low temperature within the compartment.

In order to solve this problem, the inventor has previously provided a refrigerator with a heater in order to defrost the damper. An example of such a refrigerator is disclosed in Japanese Utility Model Laid-Open Publication No. 62-93676, filed on Nov. 30, 1985. In Japanese Utility Model Laid-Open Publication No. 62-93676, the damper on the outlet of the air supply duct is provided with a heater, in addition to the motor and the position detection switch. Also, a timer is provided in a control circuit which controls the operation of the motor to open and close the damper properly. The timer counts the period for which an operating signal to drive the motor is being generated from the control circuit, and when the timer counts up a prescribed value without being reset by receiving a proper position detecting signal generated from the position detection switch, the heater is energized until the damper has been defrosted and the proper position detecting signal is generated.

In the above described device, however, it is not possible to distinguish between a damper malfunction caused by failure of the motor, the position detection switch, or damper elements, such faulty pin or a leaf spring, and the case where the damper has frosted, because the malfunction of the damper is detected by the timer. Therefore, when the malfunction of the damper is caused by something other than frosting, the malfunction will not be corrected even though the heater is energized, and the energizing of the heater will continue in an uncontrolled fashion, leading to wasteful power consumption. Particularly if the damper is locked in the closed position, the rising of temperature within the compartment is further enhanced.

SUMMARY OF THE INVENTION

It is an object of the present invention to detect the malfunction of a damper provided in a refrigerator so as to be able to distinguish the cause of the malfunction from frosting.

To accomplish the object described above, the present invention provides a refrigerator including a temperature detection device for detecting temperature within a compartment of the refrigerator. A damper drive device drives the damper in accordance with the detected temperature and the output of a damper position detection device. A heater device is provided for defrosting the damper. An abnormality detection device monitors the operation time of the damper and energizes the heater when the operation time thereof reaches a predetermined value, indicating that frosting may have occurred. A malfunction detection device monitors the operation time of the heater and deenergizes the heater when the operation time thereof reaches a predetermined value.

BRIEF DESCRIPTION OF THE DRAWINGS

The present invention is best understood with reference to accompanying drawings in which:

FIG. 4 is a greatly enlarged sectional view of a damper illustrating another embodiment of the present invention.

DETAILED DESCRIPTION OF THE PREFERRED EMBODIMENT

Referring to the accompanying drawings, an embodiment of the present invention will be described.

Figure 2:
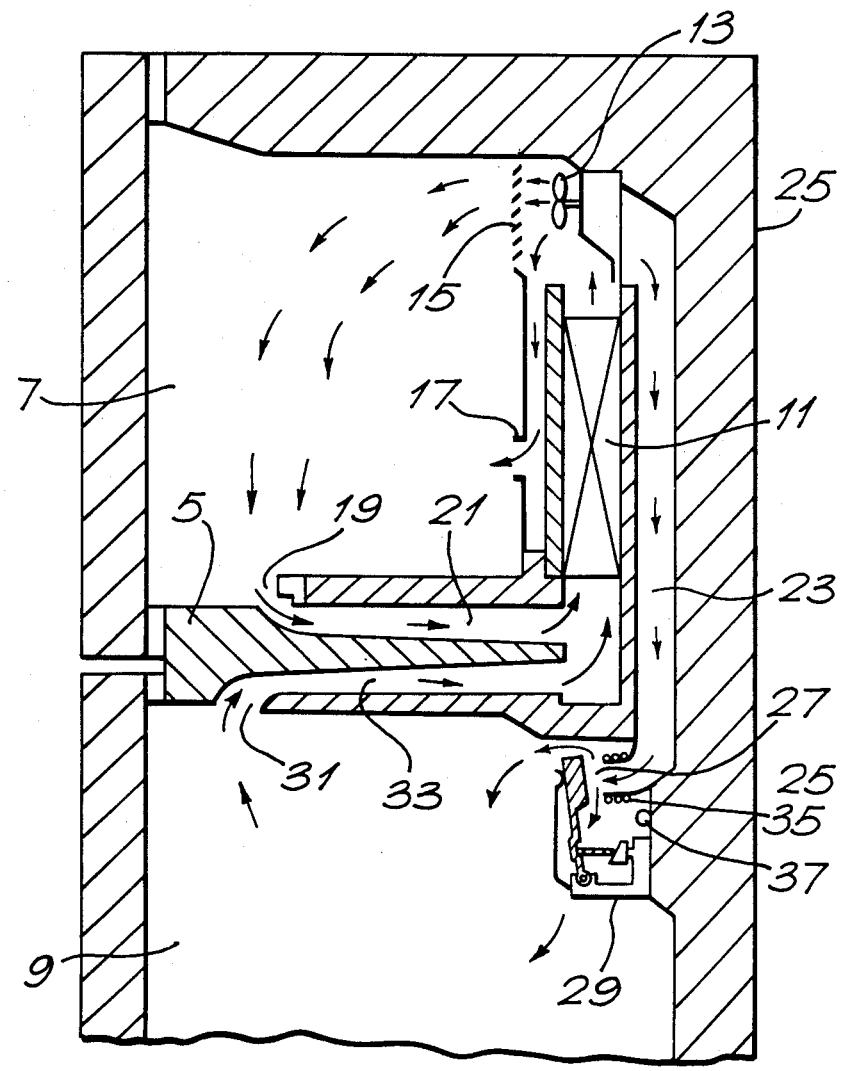
FIG. 2 is a cross-sectional view of a portion of a refrigerator illustrating the embodiment of the present invention.

As is shown in FIG. 2, the interior of a fan-cooled refrigerator is divided by a partition wall 5 into an upper freezer compartment 7 and a lower refrigerating compartment 9. An evaporator 11 is placed at the rear of the freezer compartment 7. Above evaporator 11 is positioned a cooling fan which supplies cold air generated by evaporator 11 into freezer compartment 7 through freezer compartment cold air outlets 15 and 17 provided in high and low positions in front of evaporator 11. At a front portion of the freezer compartment side of partition wall 5 is provided a freezer compartment intake 19, and a freezer compartment intermediate return duct 21 is formed horizontally from intake 17 to evaporator 11.

Behind evaporator 11 is provided vertically a refrigerating compartment cold air supply duct 23 which follows back plate 25 of the refrigerator and extends from cooling fan 13 to a refrigerating compartment cold air outlet 27. Refrigerating compartment cold air outlet 27 is provided with a damper 29 which can open and close outlet 27 and is thus capable not only of allowing the supply of cold air into refrigerating compartment 9 but also of stopping the flow of this cold air. At the front of partition wall 5 on the refrigerating compartment side is provided a refrigerating compartment intake 31, and a refrigerating compartment intermediate return duct 33 is formed horizontally from here to evaporator 11.

The refrigerating compartment side end of cold air supply duct 23 projects in a tube shape, and a heater 35 is wound therearound. A temperature sensor 37 employing a thermistor is also provided on the inside of the back wall of refrigerating compartment 9.

Figure 3:
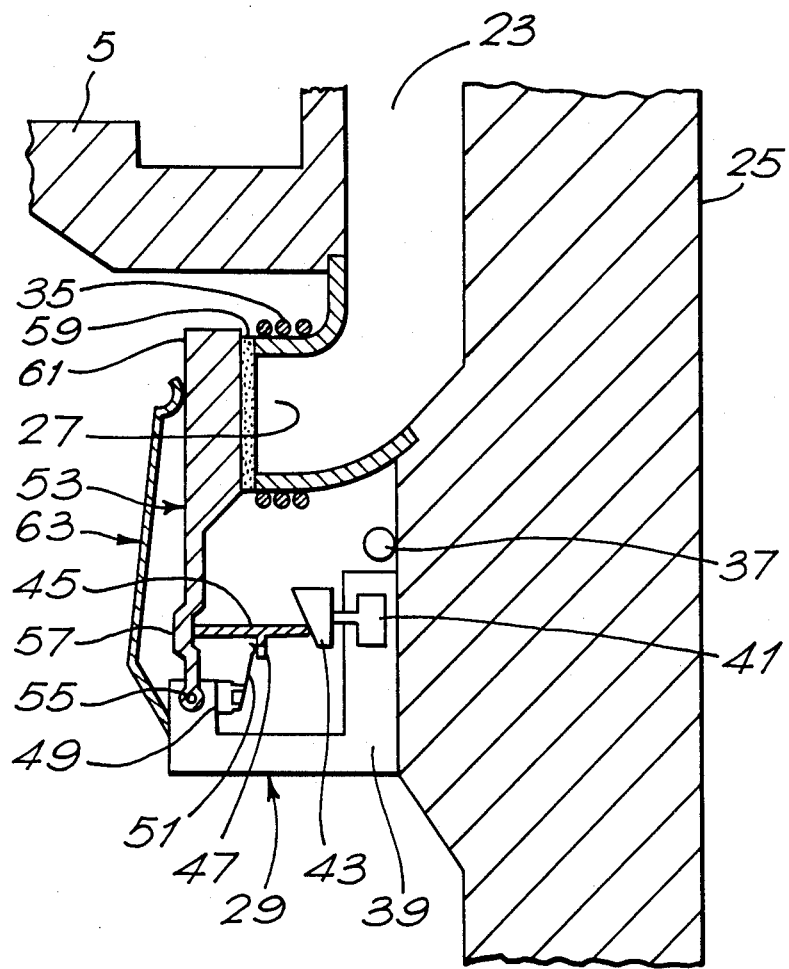
FIG. 3 is a greatly enlarged sectional view of a damper illustrating the embodiment of the present invention.

The detailed construction of the damper 29 is shown in FIG. 3. A support member 39 of damper 29 is fixed to back plate 25 of the refrigerator. A motor 41 is fixed to the rear of support member 39, and the shaft of motor 41 is connected through a gear (not shown) to a cam 43 which has the form of a cylinder cut off obliquely. A pin 45 with a projection 47 is arranged so that its rear end abuts the oblique surface of cam 43. At the front of support member 39 is disposed a position detection switch 49. This position detection switch 49 has a tongue-shaped activator 51. Actuator 51 abuts projection 47 of pin 45. Also at the front of support member 39 is hinged a damper blade 53 on a pivot 55. An intermediate portion of damper blade 53 is arched forward. The front end of pin 45 engages the concave portion of arched portion 57. A closure plate 59 is fitted to the rear surface of baffle plate 61 at the end of damper blade 53, and has the shape and dimensions that enable it to close the refrigerating compartment cold air outlet 29. Further, at the front of support member 39 is attached one end of a leaf spring 63, while the other end of leaf spring 63 presses against the front surface of baffle plate 61 and urges it backward.

When cold air outlet 27 is closed by closure plate 59, the contacts of the position detection switch 49 are off (open). When the temperature within refrigerating compartment 9, as detected by temperature sensor 37, rises above a certain temperature, then motor 41 is rotated in response to a damper open request signal. As motor 41 rotates, cam 43 also rotates, and pin 45 is pressed forward by the front surface thereof. As pin 45 advances forward, the front end thereof presses arched portion 57 of damper blade 53, and therefore, damper blade 53 is rotated against the resistance of leaf spring 63 about pivot 55, whereby cold air outlet 27 is opened. As pin 45 moves forward, actuator 51 of position detection switch 49 is pushed forward by projection 47 of pin 45. When pin 45 has moved sufficiently forward, i.e., outlet 27 has been sufficiently opened, the contacts of position detection switch 49 are closed, and a damper open detection signal is output. When the damper open detection signal is output, the operation of motor 41 is stopped, and cold air outlet 27 is maintained in the open position.

When the cold air outlet 27 is thus sufficiently opened, cold air from evaporator 11 passes through cold air supply duct 23 and enters refrigerating compartment 9 from cold air outlet 27. Thus, heat exchange with the goods stored in refrigerating compartment 9 is carried out, and after heat exchange, the cold air returns through refrigerating compartment intake 31 and return duct 33 to evaporator 11, where it is again cooled by evaporator 11. Therefore, the temperature within refrigerating compartment 9 falls.

When the temperature within refrigerating compartment 9, as detected by temperature sensor 37, falls below a certain temperature, motor 41 of damper 29 is once again driven by a close request signal, turning in the same direction as previously. As cam 43 is rotated, pin 45 is returned backward by the effect of leaf spring 63 acting through damper blade 53. The rear end of pin 45 is constantly in contact with the sloping surface of cam 43 during this operation. As pin 45 retreats, the refrigerating compartment cold air outlet 27 is closed by closure plate 59 of damper 29. Also as pin 45 returns backward, projection 47 thereof moves back. As projection 47 moves backward, activator 51 of position detection switch 49 is no longer pushed forward, and therefore the switch contacts are again open and a damper closed detection signal is output. When the damper closed detection signal is output, the operation of motor 41 is stopped, and cold air outlet 27 is maintained in the closed position.

Figure 1:
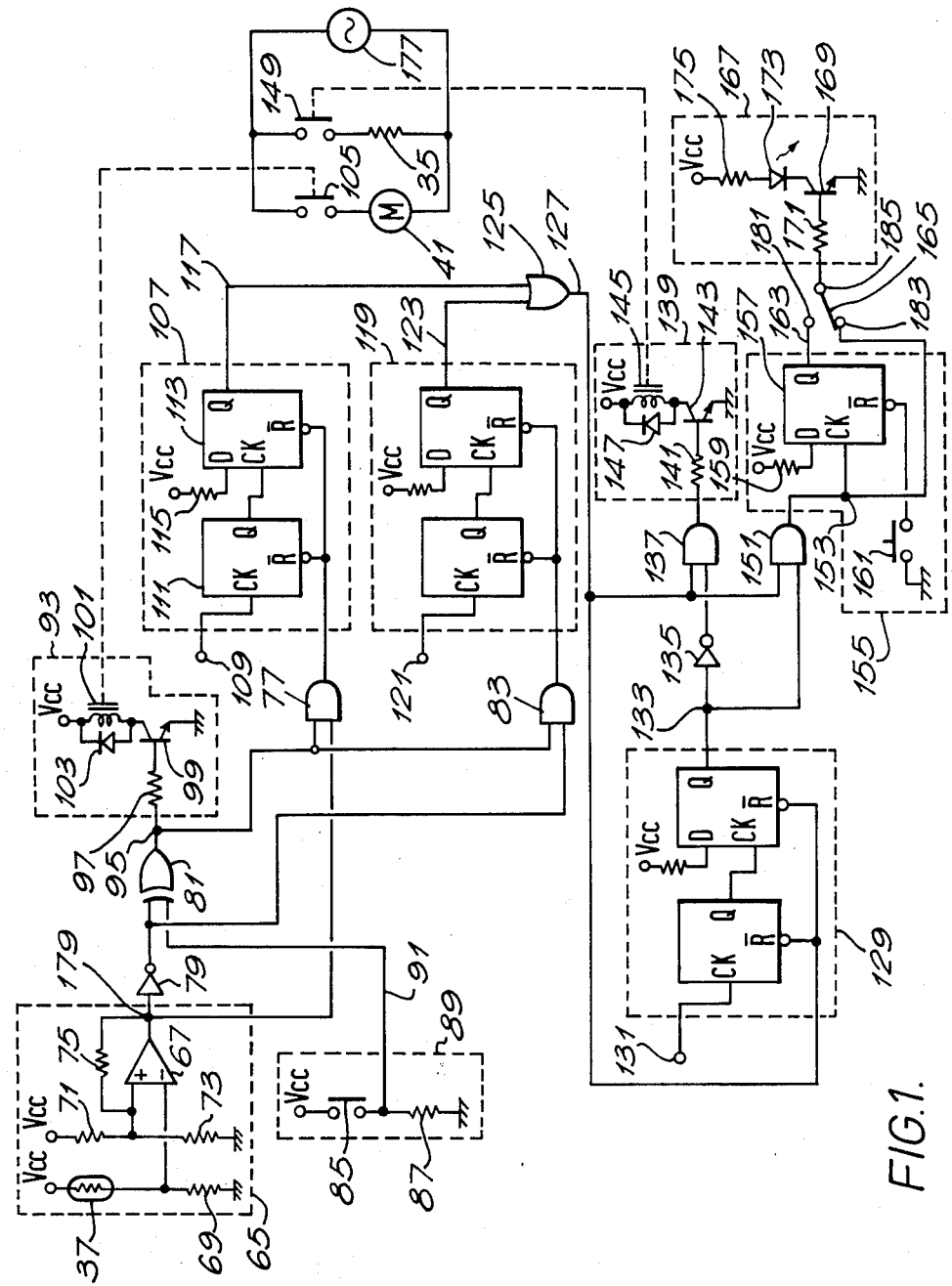
FIG. 1 is a schematic circuit diagram illustrating an embodiment of the present invention.

A schematic electrical circuit diagram of an embodiment according to the present invention is shown in FIG. 1. A temperature detection circuit 65 including temperature sensor 37 detects the temperature within refrigerating compartment 9 and carries out a comparison with a set temperature. The inverting input terminal (−) of a comparator 67 is connected through temperature sensor 37 and a resistor 69 between a DC power supply VCC and the ground line, respectively. The non-inverting input terminal (+) of comparator 67 is connected through resistors 71, 73 and 75 to the DC power supply VCC, the ground line and its own output terminal, respectively.

The output terminal of comparator 67 is connected to both a first input terminal of an AND gate 77 and an input terminal of an INVERTER gate 79. The output terminal of the INVERTER gate 79 is connected to a first input terminal of an exclusive OR gate 81 and also to a first input terminal of an AND gate 83. The second input terminal of exclusive OR gate 81 is connected through contacts 85 of position detection switch 49 and a resistor 87 to the DC power supply VCC and the ground line, respectively. The series circuit of contacts 85 and the resistor 87 forms a damper position detection circuit 89 and outputs a position detection signal 91 which is at a low level when the damper is closed and is at a high level when the damper is open.

The output of exclusive OR gate 81 is connected to a damper drive circuit 93 and also to the second input terminals of AND gates 77 and 83. Exclusive OR gate 81 outputs a damper drive signal 95.

In damper drive circuit 93, damper drive signal 95 is input through a resistor 97 to the base of a NPN transistor 99. The emitter of transistor 99 is earthed, and the collector is connected through a relay coil 101 to the DC power supply VCC. A diode 103 is connected parallel to relay coil 101, with its cathode directed towards the DC power supply VCC. Relay contacts 105 are closed when relay coil 101 is energized to drive motor 41 of damper 29.

In an open lock detection circuit 107, clock pulses from an external terminal 109 are input to the clock input terminal CK of a timer 111. The non-inverting output terminal Q of timer 111 is connected to the clock input terminal CK of a D-flip flop 113. The data input terminal D of D-flip flop 113 is pulled up to the DC power supply VCC through a resistor 115. From the non-inverting output terminal Q of the D-flip flop 113, an open lock detection signal 117 is output as the output of open lock detection circuit 107. The output of AND gate 77 is input to the reset input terminal $\overline{R}$ of timer 111 and D-flip flop 113.

A closed lock detection circuit 119 is constructed similarly to open lock detection circuit 107, receiving as an input the output from AND gate 83 and clock pulses from external terminal 121, and outputting closed lock detection signal 123. Open and closed lock detection signals 117 and 123 are each input to an OR gate 125, and OR gate 125 outputs an abnormality detection signal 127 to a malfunction detection circuit 129. Malfunction detection circuit 129 is also constructed similarly to open lock detection circuit 107, and as well as the abnormality detection signal 127 being input to the reset input $\overline{R}$ of a timer and a D-flip flop respectively, clock pulses from an external terminal 131 are also input. Malfunction detection circuit 129 outputs a malfunction detection signal 133 to an INVERTER gate 135. AND gate 137 receives abnormality detection signal 127 and the output of INVERTER gate 135, or, in other words, the inverted malfunction detection signal. The output of AND gate 137 is input to a heater drive circuit 139.

Heater drive circuit 139 is constructed similarly to damper drive circuit 93. The output of AND gate 137 is input through a resistor 141 to the base of a NPN transistor 143. Coil 145 of a relay and a diode 147 are connected to the collector of transistor 143. Relay contacts 149 are closed when relay coil 145 is energized to activate heater 35. An AND gate 151 has input thereto abnormality detection signal 127 and malfunction detection signal 133, and outputs an indication signal 153 to a memory circuit 155. In memory circuit 155, indication signal 153 is input to a clock input terminal CK of a D-flip flop 157. The data input terminal D of D-flip flop 157 is pulled up to the DC power supply VCC through a resistor 159. The reset input terminal $\overline{R}$ thereof is connected to the ground line through a manually operated automatic return switch 161. D-flip flop 157 outputs a memory signal 163 from the non-inverting output terminal thereof to one input terminal of a manual transfer switch 165. To the other input terminal of manual transfer switch 165, indication signal 153 is input from AND gate 151. The output voltage of transfer switch is applied to an indication circuit 167.

In indication circuit 167, the voltage input from transfer switch 165 is applied to the base of a NPN transistor 169 through a resistor 171. The emitter of transistor 169 is earthed, and the collector thereof is connected to the cathode of a light-emitting diode 173. The anode of light-emitting diode 173 is connected through a resistor 175 to the DC power supply VCC.

The series circuit of relay contacts 105 and motor 41 of damper 29 is connected to an AC power supply 177. Motor 41 may be, for example, a synchronous motor. Moreover, parallel to this series circuit is a series circuit of relay contacts 149 and damper defrosting heater 35.

When damper 29 is not subject to frosting and there is no malfunction, the operation of the fan-cooled refrigerator of this embodiment is as follows. When damper 29 is in the closed position, contacts 85 of position detection switch 49 are open, and therefore position detection signal 91 which is input to the second input terminal of exclusive OR gate 81 is at a low level, being a damper closed detection signal. In this state, if the temperature within refrigerating compartment 9 detected by temperature sensor 37 reaches a certain temperature or above, a temperature detection signal 179 output from temperature detection circuit 65 becomes a low level. The low level temperature detecting signal 179 is inverted by INVERTER gate 79 to be a high level open request signal. Since position detection signal 91 is at a low level, damper drive signal 95 output from exclusive OR gate 81 becomes a high level. Therefore, transistor 99 turns on, relay coil 101 is energized, relay contacts 105 are closed, and motor 41 is operated to open damper 29.

At the same time as the damper drive signal 95 goes to the high level, the output of AND gate 83 changes to a high level, and the counting of the timer within the closed lock detection circuit 119 is started. At this time, the output of AND gate 77 is unchanged at a low level, and timer 111 within open lock detection circuit 107 remains reset. When the damper 29 is sufficiently open, contacts 85 of the damper position detecting circuit 89 are closed. Then position detection signal 91 will change to a high level. Since temperature detection signal 179 remains at low level and is inverted by INVERTER gate 79 to be a high level open request signal, damper drive signal 95 from exclusive OR gate 81 will return to a low level, and the operation of motor 41 will be stopped. When damper drive signal 95 changes to a low level, the output of AND gate 83 changes to the low level, and the counting of the timer within closed lock detection circuit 119 will be reset. The set time interval TC of this timer within closed lock detection circuit 119 is set to be longer than the time period required for damper 29 to be opened.

In this case, in other words, when damper 29 is not subject to frosting and there is no malfunction, the timer within closed lock detecting circuit 119 will not produce an output, and high level closed lock detection signal 123 will not be output therefrom.

Since both open lock detecting signal 117 from open lock detection circuit 107 and closed lock detection signal 123 from closed lock detection circuit 119 will not become high, abnormality detection signal 127 from OR gate 125 will not become high. Therefore, heater 35 will not be energized, D-flip flop 157 within memory circuit 155 will not be set, and light-emitting diode 173 will be off.

When motor 41 is stopped and damper 29 is maintained in the open position, cold air generated by evaporator 11 flows into refrigerating compartment 9 through cold air supply duct 23 and cold air outlet 27 to cool the interior of refrigerating compartment 9. When the temperature within refrigerating compartment 9 detected by temperature sensor 37 falls below a set temperature, temperature detection signal 179 output from temperature detection circuit 65 changes to a high level. The high level temperature detection signal 179 is inverted by INVERTER gate 79 to be a low level close request signal. Since damper 29 is in the open position and position detection signal 91 is at a high level, being an open detection signal, damper drive signal 95 output from exclusive OR gate 81 becomes high, and motor 41 is once again started. At the same time that the damper drive signal 95 changes to a high level, the output of AND gate 77 changes to a high level, and timer 111 within open lock detection circuit 107 begins timing. Since the output of AND gate 83 remains at a low level, the timer within closed lock detection circuit 119 remains reset. When damper 29 is closed, contacts 85 of damper position detection circuit 89 are opened.

Then position detection signal 91 becomes a low level, but since the temperature detection signal remains at a high level, being inverted by INVERTER gate 79 to be a low level close request signal, damper drive signal 95 from exclusive OR gate 81 again returns to a low level, and the operation of motor 41 is stopped. When damper drive signal 95 changes to a low level, the output of AND gate 77 changes to a low level, and timer 111 within open lock detection circuit 107 is reset.

The set time interval TO of timer 111 is set to be longer than the time period required for damper 29 to be closed. Therefore, if damper 29 is not subject to frosting and there is no malfunction, timer 111 within open lock detection circuit 107 will not generate a high level open lock detection signal 117. Because not only closed lock detection signal 123 but also open lock detection signal 117 will not go to a high level, abnormality detection signal 127 from OR gate 125 will not become high. Therefore, heater 35 will not be energized, D-flip flop 157 within memory circuit 155 will not be set, and light-emitting diode 173 will not be turned on.

When frosting has occurred on the damper 29, the operation is as follows. Suppose damper 29 has frosted and is locked in the closed position. The temperature within refrigerating compartment 9 is rising. When the temperature therein detected by temperature sensor 37 exceeds the set temperature, temperature detection signal 179 from temperature detection circuit 65 becomes low level. The low level temperature detection signal 179 is inverted by INVERTER gate 79 to be a high level open request signal. In this case, however, since damper 29 is frosted, even after the set time TC has elapsed, contacts 85 of damper position detection circuit 89 will not be closed, and the timer within closed lock detection circuit 119 will not be reset.

Therefore, when the set time interval TC has elapsed, a high level closed lock detection signal 123 is output from closed lock detection circuit 119, and abnormality detection signal 127 from OR gate 125 becomes high. When abnormality detection signal 127 goes to a high level, the timer operation of malfunction detection circuit 129 is started. At this time, malfunction detection signal 133 is low. Therefore, indication signal 153 from AND gate 151 is low, D-flip flop 157 within memory circuit 155 is not set, and light-emitting diode 173 of indication circuit 167 is not turned on.

However, when abnormality detection signal 127 becomes high, the output of AND gate 137 changes to a high level. Therefore, transistor 143 of heater drive circuit 139 is turned on, relay coil 145 is energized, and relay contacts 149 are closed to cause heater 35 to be energized. As a result, damper 29 is defrosted. Since the set time interval TE of the timer within malfunction detection circuit 129 is set to be longer than the time period required to remove the frost from damper 29, for example two hours, damper 29 will be defrosted before the timer generates an output, and damper 29 will be released. Being thus released, damper 29 begins to move and, as described above, when damper 29 is sufficiently open, contacts 85 of position detection switch 49 are closed, position detection signal 91 becomes high, and damper driving signal 95 from exclusive OR gate 81 becomes low.

Therefore, the operation of motor 41 is stopped and also the output of AND gate 83 changes to a low level, and the timer and the D-flip flop within closed lock detection circuit 119 are reset. At this point, since closed lock detection signal 123 changes from a high level to a low level, abnormality detection signal 127 from OR gate 125 returns to a low level and heater 35 is deenergized, while at the same time the counting of the timer in malfunction detection circuit 129 is reset. Therefore, malfunction detection signal 133 does not go to a high level, and in this case also, D-flip flop 157 of memory circuit 155 is not set and light-emitting diode 173 of indication circuit 167 is not turned on.

When the damper 29 is frosted and locked in the open position, then when open lock detection signal 117 goes to a high level, abnormality detection signal 127 from OR gate 125 becomes high. Thereafter, the operation is the same, as in the case that damper 29 is locked in the closed position.

When a malfunction of damper 29 such as described earlier occurs, the operation is as follows. Suppose damper 29 has malfunctioned and is locked in the closed position. The temperature within refrigerating compartment 9 rises above the set temperature. Temperature detection signal 179 from temperature detection circuit 65 becomes low. The low level temperature detection signal 179 is inverted by INVERTER gate 79 to be a high level open request signal. As in the case of frosting, closed lock detection signal 123 from closed lock detection circuit 119 becomes high and abnormality detection signal 127 from OR gate 125 becomes high.

However, even though abnormality detection signal 127 goes to a high level and heater 35 is energized for the set time interval TE, damper 29 is not released from its locked state. Therefore, the timer in malfunction detection circuit 129 generates a high output, and the output of the D-flip flop in malfunction detection circuit 129 rises to a high level. Thus, a high level malfunction detection signal 133 is output from malfunction detection circuit 129.

When malfunction detection signal 133 becomes high, the output of AND gate 137 becomes low, and heater 35 is turned off. Therefore, the wasteful supply of electricity to the heater 35 is not continued. Also when malfunction detection signal 133 goes to a high level, indication signal 153 from AND gate 151 rises to a high level. Therefore, D-flip flop 157 in memory circuit 155 is set and the occurrence of the damper malfunction is stored. At this time, both when manual transfer switch 165 is switched to connect contact terminal 181 and contact terminal 185 and when manual transfer switch 165 is switched to connect contact terminal 183 and contact terminal 185, a high level indication signal 153 is applied to NPN transistor 169 of indication circuit 167 and light-emitting diode 173 thereof is turned on. If the reason for the malfunction is a temporary mechanical failure of damper 29, there is a possibility that this failure will correct itself. In this case, when manual transfer switch 165 is switched to connect contact terminal 183 and contact terminal 185, light-emitting diode 173 of the indication circuit 167 will go off as malfunction detection signal 133 becomes low. Even in the event of a temporary malfunction of damper 29, D-flip flop 157 of memory circuit 155 will remain set until switch 161 is depressed. Therefore, in this case, if manual transfer switch 165 is switched to connect contact terminal 181 and contact terminal 185, the contents stored in D-flip flop 157 can be indicated by light-emitting diode 173. So it is possible to know of a temporary malfunction occurring.

As can be understood from the above-described embodiment, malfunction detection circuit 129 monitors the time which heater 35 is energized in accordance with abnormality detection signal 127. And when a certain time elapses without abnormality detection signal 127 being reset, malfunction detection circuit 129 outputs malfunction detection signal 133, by which heater 35 is deenergized, and memory circuit 155 stores malfunction detection signal 133. Therefore, it is possible to detect the distinction between the malfunction and the frosting of damper 29. When damper 29 does malfunction, useless energization of heater 35 is avoided so that power is not wasted and the temperature within refrigerating compartment 9 is not unnecessarily raised.

Moreover, temporary malfunctioning of damper 29, which causes the temperature within refrigerating compartment 9 to rise temporarily, e.g., for one day, can be easily detected.

The present invention has been described with respect to a specific embodiment. However, other embodiments based on the principles of the present invention should be obvious to those of ordinary skill in the art. For example, a photoelectric switch 100 (shown in FIG. 4) which outputs a high level or a low level position detection signal corresponding with the state of the damper may be employed in the damper position detection circuit. Such embodiments are intended to be covered by the claims.

What is claimed is:

1. A refrigerator including a damper controlling inflow of cold air into a compartment thereof, comprising:
   means for detecting temperature within the compartment;
   means for driving the damper in accordance with the temperature detected by the temperature detecting means;
   means for detecting a position of the damper;
   heater means for defrosting the damper;
   abnormality detection means for monitoring an operation time of the damper and energizing the heater means when the operation time of the damper reaches a predetermined value without being reset by the damper position detecting means indicating the damper has assumed a desired position; and
   malfunction detection means for monitoring an operation time of the heater means and deenergizing the heater means when the operation time of the heater means reaches a predetermined value without being reset by the abnormality detection means.

2. A refrigerator according to claim 1 further including a memory means for storing an indication of the malfunction of the damper in response to the malfunction detection means.

3. A refrigerator according to claim 1 further including means for indicating the malfunction of the damper in accordance with the malfunction detection means.

4. A refrigerator according to claim 1, wherein the malfunction detection means includes a timer circuit and a flip-flop circuit, the timer circuit being operated in response to an output from the abnormality detection means, and the flip-flop circuit being set in response to an output of the timer circuit.

5. A refrigerator according to claim 2, further comprising:
   means for indicating the malfunction of the damper in accordance with the malfunction detection means, the memory means includes a flip-flop circuit to be set in response to an output of the malfunction detection means and a manually operated switch for resetting the flip-flop; and
   switch means for selectively connecting the indicating means to the memory means to cause the indicting means to display the content of the memory means.

6. A refrigerator according to claim 1, wherein the abnormality detection means includes an open lock detection circuit for detecting the locking of the damper in an open state, and a closed lock detection circuit for detecting the locking of the damper in a closed state.

7. A refrigerator according to claim 6, wherein the open lock detection circuit includes a timer element and a flip-flop element, the timer element being operated in response to the temperature detecting means until the damper position detecting mean detects the closed state of the damper, and the flip-flop element being set in response to an output of the timer element.

8. A refrigerator according to claim 6, wherein the closed lock detection circuit includes a timer element and a flip-flop element, the timer element being operated in response to the temperature detecting means until the damper position detecting means detects the open state of the damper, and the flip-flop element being set in response to an output of the timer element.

9. A refrigerator according to claim 1, wherein the damper driving means includes a motor, a conic cam element connected for rotation by the motor, a pin element and a spring element, the pin element having two ends and a projection part therebetween, being kept in touch with the surface of the conic cam element by the spring, and moving the damper against the spring element in accordance with the rotation of the conic cam element by the motor.

10. A refrigerator according to claim 9, wherein the damper position detecting means includes a position detection switch, the contacts thereof being closed by the projection part of the pin element.

11. A refrigerator according to claim 10 further including an inlet of cold air to be closed or opened by the damper, the heater means being wound therearound.

12. A refrigerator according to claim 1, wherein the damper position detecting means includes a photoelectric switch whose contacts are closed or opened in accordance with the position of the damper.

13. A method for detecting a malfunction of a refrigerator comprising the steps of:
   detecting the temperature in a compartment of the refrigerator;
   driving a damper for controlling the inflow of cold air into the compartment in accordance with the detected temperature;
   monitoring the time that the damper is driven and energizing a heater for defrosting the damper when the driven time of the damper reaches a predetermined value; and
   monitoring the time that the heater is energized and deenergizing the heater when the energization time of the heater reaches a predetermined value.

14. A method for detecting a malfunction of a refrigerator comprising the steps of:
   detecting the temperature in a compartment of the refrigerator;
   driving a damper for controlling the inflow of cold air into the compartment in accordance with the detected temperature;
   monitoring the time that the damper is driven and energizing a heater for defrosting the damper when the driven time reaches a predetermined value;
   monitoring the time that the heater is energized and deenergizing the heater when the energization time of the heater reaches a predetermined value; and
   storing an indication that the energization time of the heater reaches the predetermined value.

* * * * *